United States Patent
Pan

(10) Patent No.: US 10,999,563 B2
(45) Date of Patent: May 4, 2021

(54) OPTICAL ENGINE MODULE AND PROJECTION APPARATUS

(71) Applicant: Coretronic Corporation, Hsin-Chu (TW)

(72) Inventor: Haw-Woei Pan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/857,182

(22) Filed: Apr. 24, 2020

(65) Prior Publication Data

US 2020/0351479 A1 Nov. 5, 2020

(30) Foreign Application Priority Data

Apr. 30, 2019 (CN) .......................... 201920612022.1

(51) Int. Cl.
*G03B 21/20* (2006.01)
*H04N 9/31* (2006.01)

(52) U.S. Cl.
CPC ....... *H04N 9/3152* (2013.01); *G03B 21/2033* (2013.01); *G03B 21/2066* (2013.01)

(58) Field of Classification Search
CPC .............. G03B 21/208; G03B 21/2033; H04N 9/3152; H04N 9/3161
See application file for complete search history.

(56) References Cited

U.S. PATENT DOCUMENTS

| | | | |
|---|---|---|---|
| 2013/0107360 A1 | 5/2013 | Kurtz et al. | |
| 2014/0354956 A1* | 12/2014 | Yamada | H04N 9/3167 353/20 |
| 2016/0073072 A1* | 3/2016 | Tanaka | H04N 9/3155 353/31 |
| 2016/0147135 A1* | 5/2016 | Cheng | G03B 21/204 353/31 |
| 2016/0363840 A1* | 12/2016 | Mizoguchi | G03B 21/142 |
| 2018/0184057 A1 | 6/2018 | Jannard et al. | |

* cited by examiner

*Primary Examiner* — Ryan D Howard
(74) *Attorney, Agent, or Firm* — JCIPRNET

(57) ABSTRACT

An optical engine module disposed on a transmission path of an illumination beam is provided. The optical engine module includes a light homogenizing element, an optical lens assembly, a first reflective element, and a light valve. The light homogenizing element is configured to enable the illumination beam to pass through. The optical lens assembly is disposed on the transmission path of the illumination beam and constituted of at least three lenses having refractive power. The first reflective element is disposed on the transmission path of the illumination beam. The light valve is disposed on the transmission path of the illumination beam and configured to convert the illumination beam into an image beam, wherein the illumination beam is sequentially transmitted from the light homogenizing element to the optical lens assembly and the first reflective element, and is reflected to the light valve by the first reflective element.

17 Claims, 3 Drawing Sheets

OPTICAL ENGINE MODULE AND PROJECTION APPARATUS

CROSS-REFERENCE TO RELATED APPLICATION

This application claims the priority benefit of China application serial no. 201920612022.1, filed on Apr. 30, 2019. The entirety of the above-mentioned patent application is hereby incorporated by reference herein and made a part of this specification.

BACKGROUND

Technical Field

The invention is related to an optical apparatus, and more particularly to an optical engine module and a projection apparatus.

Description of Related Art

A projection apparatus is a display apparatus adapted to generate a large-sized frame, and has been continuously progressing with the evolution and innovation of technology. The imaging principle of the projection apparatus is to convert an illumination beam generated by an illumination system into an image beam by a light valve (such as: a digital micromirror device), and then project the image beam through a projection lens onto a projection target (such as: a screen or a wall surface) so as to form a projection image.

In current technological development, if a projector is to have an optical performance conforming with ITU-R BT.2020 color gamut, a brightness between 1000 lumens and 1500 lumens and a contrast ratio of 3000:1, then the projector needs to adopt red, green and blue lasers as its light sources. Moreover, in addition to the aforementioned optical indicator specification color gamut, brightness and contrast, if a projection system is to have better brightness uniformity and color uniformity, then an optical engine module in the projector needs to adopt an optical structure with telecentric characteristics.

However, under the optical structure with telecentric characteristics, a total internal reflection prism (TIR prism) or a reverse total internal reflection prism (R-TIR prism) is often used as a light guide element for guiding the light that is incident on/emitted from the digital micromirror element. Nevertheless, the TIR prism and the R-TIR prism are relatively expensive optical elements, which will make the overall cost high; and only by applying an optical coating on an optical surface of the TIR prism/R-TIR prism that is close to the digital micromirror element and on a total reflection surface of the TIR prism/R-TIR prism, the TIR prism/R-TIR prism is able to receive light from different angles, but this optical coating will cause about 11% light loss.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides an optical engine module and a projection apparatus capable of effectively lowering the costs and providing a favorable optical effect.

Other features and advantages of the invention can be further understood by the technical features disclosed in the invention.

To achieve one, part, or all of the objectives aforementioned or other objectives, an embodiment of the invention provides an optical engine module disposed on a transmission path of an illumination beam that includes at least three laser beams. The optical engine module includes a light homogenizing element, an optical lens assembly, a first reflective element and a light valve. The light homogenizing element is configured to enable the illumination beam to pass through. The optical lens assembly is disposed on the transmission path of the illumination beam. The optical lens assembly is constituted of at least three lenses having refractive power. The first reflective element is disposed on the transmission path of the illumination beam. The light valve is disposed on the transmission path of the illumination beam and is configured to convert the illumination beam into an image beam, wherein the illumination beam is sequentially transmitted from the light homogenizing element to the optical lens assembly and the first reflective element and is reflected by the first reflective element to the light valve.

To achieve one, part, or all of the objectives aforementioned or other objectives, an embodiment of the invention provides a projection apparatus including an illumination system, an optical engine module and a projection lens. The illumination system includes at least three laser light sources configured to provide at least three laser beams. The at least three laser beams are configured to form an illumination beam. The optical engine module is disposed on a transmission path of the illumination beam. The optical engine module includes a light homogenizing element, an optical lens assembly, a first reflective element and a light valve. The light homogenizing element is configured to enable the illumination beam to pass through. The optical lens assembly is disposed on the transmission path of the illumination beam. The optical lens assembly is constituted of at least three lenses having refractive power. The first reflective element is disposed on the transmission path of the illumination beam. The light valve is disposed on the transmission path of the illumination beam and is configured to convert the illumination beam into an image beam. The projection lens is disposed on the transmission path of the illumination beam and is configured to project the image beam onto a projection target (not shown), wherein the illumination beam is sequentially transmitted from the light homogenizing element to the optical lens assembly and the first reflective element and is reflected by the first reflective element to the light valve.

In view of the above, the embodiments of the invention have at least one of the following advantages or effects. In the projection apparatus of the invention, the optical engine module of the projection apparatus is disposed on the transmission path of the illumination beam, and this illumination beam is converted into an illumination beam with telecentric characteristics by the optical lens assembly and the reflective element of the optical engine module and is transmitted to the light valve. Therefore, the costs can be effectively reduced while a contrast ratio of the projection apparatus is enhanced, thereby providing a favorable optical effect.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
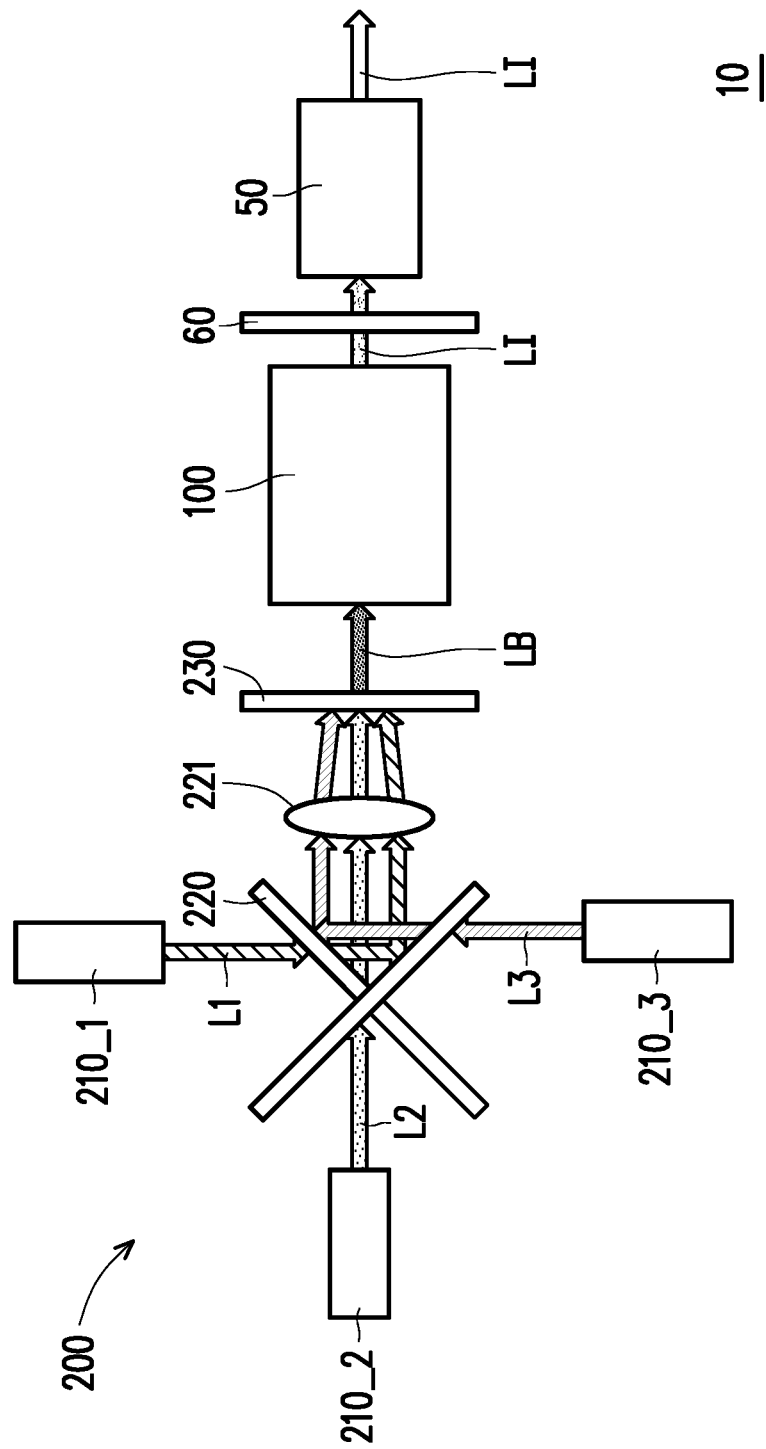
FIG. 1 is a schematic diagram of a projection apparatus according to an embodiment of the invention.

FIG. 1 is a schematic diagram of a projection apparatus 10 according to an embodiment of the invention. Referring to FIG. 1, in the embodiment, the projection apparatus 10 is configured to provide an image beam LI. Specifically, the projection apparatus 10 includes an illumination system 200, an optical engine module 100 and a projection lens 50. The illumination system 200 includes at least three laser light sources 210_1, 210_2 and 210_3, which can provide at least three laser beams L1, L2 and L3 to form an illumination beam LB. The optical engine module 100 is disposed on a transmission path of the illumination beam LB, and is configured to convert the illumination beam LB into at least an image beam LI. The illumination beam LB refers to a beam provided by the illumination system 200 and before passing through the light valve 140 (see FIG. 2) of the optical engine module 100. The projection lens 50 is disposed on a transmission path of the image beam LI, and is configured to project the image beam LI onto a projection target (not shown), such as a screen or a wall surface. In the embodiment, a contrast ratio of an image formed by the image beam LI on the projection target can be greater than 1500:1. The projection apparatus 10 of the embodiment has a favorable optical effect. The illumination system 200 includes the at least three laser light sources 210_1, 210_2 and 210_3, which can respectively provide the at least three laser beams L1, L2 and L3. In the embodiment, the laser light source 210_1 is a laser diode (LD) capable of emitting a green laser, the laser light source 210_2 is a LD capable of emitting a blue laser, and the laser light source 210_3 is a LD capable of emitting a red laser. Therefore, the three laser beams L1, L2 and L3 respectively provided by the three laser light sources 210_1, 210_2 and 210_3 can be used as red, green and blue lights required by the projection apparatus 10. It is to be understood that the term "three" as used herein includes singles, combinations or species in a quantity of three, such as three groups or three types, etc., but the invention is not limited thereto.

Specifically, in the embodiment, the illumination system 200 further includes a beam splitter assembly 220 and a diffuser 230. The beam splitter assembly 220 is disposed on transmission paths of the laser beams L1, L2 and L3, and can combine the laser beams L1, L2 and L3 into a mixed beam. In the embodiment, the mixed beam is, for example, a white light beam. Moreover, in the embodiment, the beam splitter assembly 220, for example, uses an X-shaped beam splitter, and thus enables the laser light sources 210_1, 210_2 and 210_3 in the illumination system 200 to change in configuration or positions based on the needs. In some embodiments, the beam splitter assembly 220 may also use a dichroic mirror for reflecting lights with different wavelength ranges, but the invention is not limited thereto.

The diffuser 230 is disposed between the three laser light sources 210_1, 210_2 and 210_3 and the optical engine module 100, and is capable of diffusing the laser beams L1, L2 and L3. In the embodiment, the diffuser 230 is a diffuser wheel, disposed between the laser light sources 210_1, 210_2 and 210_3 and the light homogenizing element 110, which allows the laser beams L1, L2 and L3 to pass through to obtain a diffusing effect so as to eliminate speckle. Thus, speckle patterns generated when the laser beams L1, L2 and L3 pass through the optical element can be reduced, thereby improving an optical effect of the illumination system 200. In some embodiments, the illumination system 200 may further include a condenser lens 221 disposed on the transmission paths of the laser beams L1, L2 and L3 and located between the beam splitter assembly 220 and the light homogenizing element 110 of the optical engine module 100. Further, the condenser lens 221 can be disposed between the beam splitter assembly 220 and the diffuser 230 for concentrating the illumination beam from the beam splitter assembly 220, and causing the concentrated illumination beam to be incident to the diffuser 230. However, the invention is not limited thereto.

The projection lens 50 is disposed on the transmission path of the image beam LI, and is configured to project the image beam LI onto the projection target (not shown). The projection lens 50 includes, for example, a combination of one or more optical lenses having refractive power, such as various combinations of non-planar lenses including a biconcave lens, a biconvex lens, a concave-convex lens, a convex-concave lens, a plano-convex lens and a plano-concave lens. In one embodiment, the projection lens 50 may further include a planar optical lens that projects the image beam LI from the light valve 140 (see FIG. 2) to the projection target in a reflective manner. The invention does not limit the form and the type of the projection lens 50.

In the embodiment, the projection apparatus 10 further includes a planar optical element 60 having a refractive power of 0 and disposed on the transmission path of the image beam LI. The planar optical element 60 is, for example, a glass or an oscillating device that serves as a dustproof member or an optical element for enhancing resolution.

Figure 2:
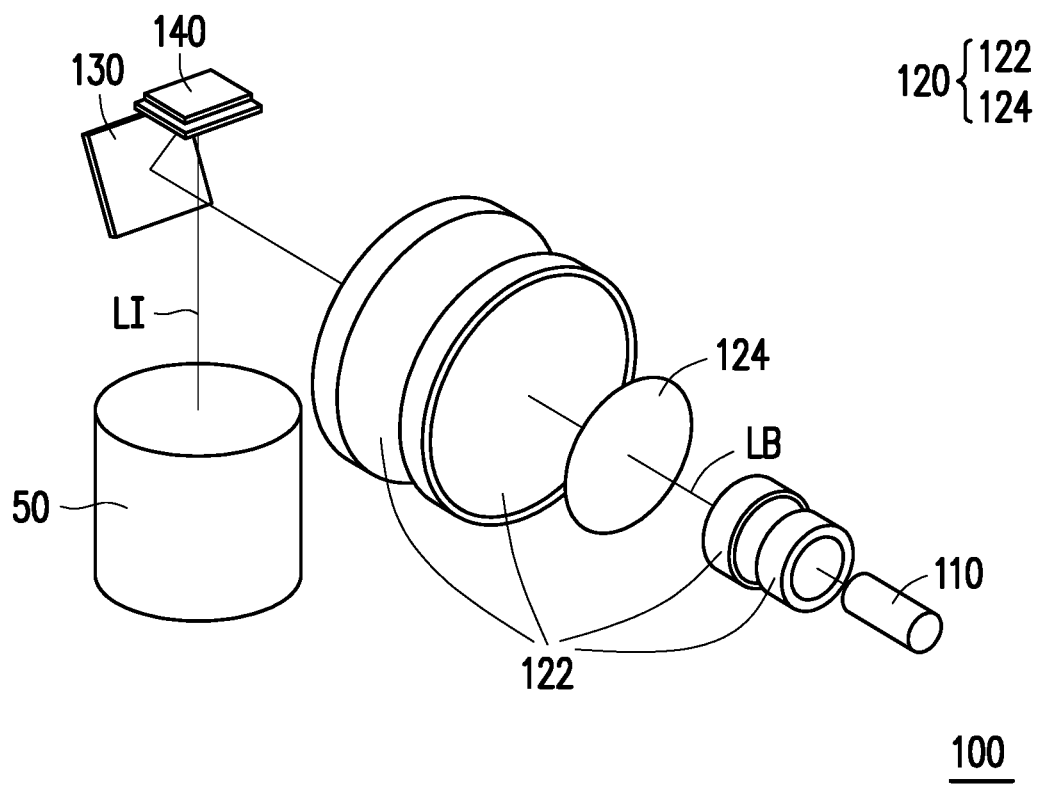
FIG. 2 is a partial perspective diagram of the projection apparatus of FIG. 1.

FIG. 2 is a partial perspective diagram of the projection apparatus 10 of FIG. 1. Referring to FIG. 1 and FIG. 2, the optical engine module 100 is disposed on the transmission path of the illumination beam LB for converting the illumination beam LB into the image beam LI. In the embodiment, the optical engine module 100 includes the light homogenizing element 110, the optical lens assembly 120, the first reflective element 130 and the light valve 140.

The light homogenizing element 110 enables the illumination beam LB to pass through. In detail, the light homogenizing element 110 is configured to adjust the speckle pattern of the beam so that the speckle pattern of the illumination beam LB can match a shape (for example, a rectangle) of a working area of the light valve 140 and can have a uniform or nearly uniform light intensity throughout the speckle pattern, thereby homogenizing the light intensity of the illumination beam LB. In the embodiment, the light homogenizing element 110 is, for example, an integral rod. However, in other embodiments, the light homogenizing element 110 may also be other optical element of appropriate form, such as a lens array (fly eye lens array), but the invention is not limited thereto.

The optical lens assembly 120 is disposed on the transmission path of the illumination beam LB, and the optical lens assembly 120 is constituted of at least three lenses having refractive power. Specifically, in the embodiment, the optical lens assembly 120 is, for example, constituted of four lenses 122 having refractive power. Radiuses of curvature and materials of the lenses 122 can be selected according to the needs, and the invention does not limit the forms and the types of the lenses 122. In one embodiment, the optical lens assembly 120 may include a relay lens. In the embodiment, the optical lens assembly includes an aperture 124, and the aperture 124 is located between two adjacent lenses having refractive power for reducing stray light and controlling an F-number (F #) of the illumination beam LB in the optical engine module 100. Specifically, in the embodiment, the aperture 124 is located after a second lens of the lenses 122 having the refractive power in a transmission direction of the illumination beam LB. The aperture 124 may, for example, be a light-shielding element or a light-transmissive element with visible light reflective coating, but the invention is not limited thereto.

The first reflective element 130 is disposed on the transmission path of the illumination beam LB for changing the transmission direction of the illumination beam LB. The first reflective element 130 may, for example, be a refractive mirror or a prism with reflective coating, but the invention is not limited thereto. In other words, the embodiment replaces a total internal reflection prism (TIR prism) or a reverse total internal reflection prism (RTIR prism) used in the conventional art with a refractive mirror. Thus, as compared to the conventional art, the configuration of the optical engine module 100 of the embodiment can effectively improve the light output efficiency and be reduced in the costs.

The light valve 140 is disposed on the transmission path of the illumination beam LB, and can convert the illumination beam LB into the image beam LI. The light valve 140 is, for example, a reflective light modulator, such as a liquid crystal on silicon panel (LCoS panel), a digital micro-mirror device (DMD) or so forth. In some embodiments, the light valve 140 may also be a transmissive light modulator, such as a transparent liquid crystal panel, an electro-optical modulator, a magneto-optic modulator, an acousto-optic modulator (AOM) or so forth. The invention does not limit the form and the type of the light valve 140. Detail steps and implementations regarding a method for converting the illumination beam LB into the image beam LI by the light valve 140 can be sufficiently taught, suggested and implemented with the general knowledge in the art, and therefore will not be described herein.

In the embodiment, the illumination beam LB is sequentially transmitted from the light homogenizing element 110 to the optical lens assembly 120 and the first reflective element 130, and is reflected by the first reflective element 130 to the light valve 140, wherein the illumination beam LB transmitted to the light valve 140 has telecentric characteristics. In details, in the embodiment, a distance between a focus point of the illumination beam LB transmitted from the first reflective element 130 to the light valve 140 and the light valve 140 is greater than or equal to 1000 mm. That is, an absolute value of the distance between the light valve 140 and the focus point of the illumination beam LB is greater than or equal to 1000 mm. In addition, a difference between incident angles of the illumination beam LB transmitted from the first reflective element 130 to the light valve 140 at different locations on the light valve 140 is less than 1.5 degrees. In detail, the illumination beam LB includes a beam incident at a center position of the light valve 140 and a beam incident at the other position of the light valve 140, and a maximum angular difference between the two is less than 1.5 degrees. The beam incident on the light valve 140 has characteristics of a small etendue beam. Therefore, the contrast ratio of the projection apparatus 10 can become greater than 1500:1 (for example, 3000:1), so that the projection apparatus 10 of the embodiment has a favorable optical effect.

In addition to achieving the aforementioned optical conditions by using the optical lens assembly 120 and the first reflective element 130, in one embodiment, the configuration of the optical lens assembly 120 and the first reflective element 130 may further be used to enable an F-number (F #) of the illumination beam LB transmitted from the first reflective element 130 to the light valve 140 to be ranged between 2.8 and 8.0, but the invention is not limited thereto. In a preferred embodiment, the F-number of the illumination beam LB transmitted from the first reflective element 130 to the light valve 140 is ranged between 3.0 and 3.4.

Figure 3:
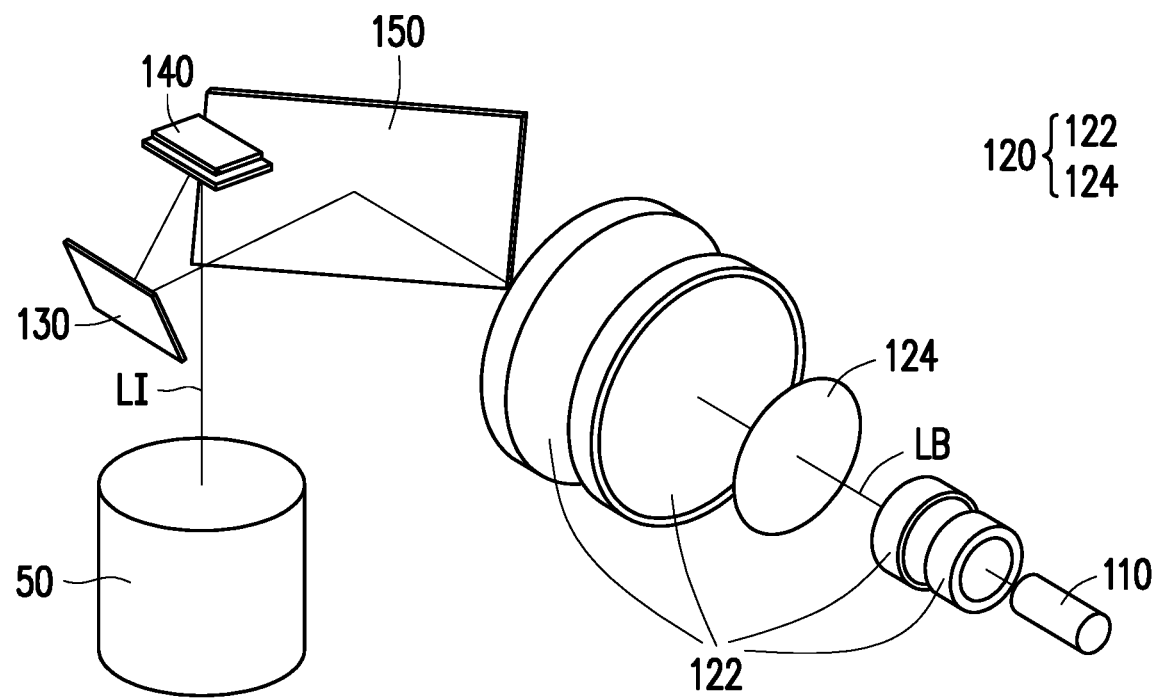
FIG. 3 is a perspective diagram of a portion of a projection apparatus according to another embodiment of the invention.

FIG. 3 is a perspective diagram of a portion of a projection apparatus according to another embodiment of the invention. Referring to FIG. 1 and FIG. 3, an optical engine module 100A as illustrated in the embodiment can at least be applied to the projection apparatus 10 of FIG. 1 for replacing the optical engine module 100. The optical engine module 100A of the embodiment is similar to the optical engine module 100 as illustrated in FIG. 2. A difference between the two lies in that, in the embodiment, the optical engine module 100A further includes a second reflective element 150 disposed on the transmission path of the illumination beam LB and located between the optical lens assembly 120 and the first reflective element 130. Thus, in the embodiment, the illumination beam LB is sequentially transmitted from the light homogenizing element 110 to the optical lens assembly 120 and the second reflective element 150, and is sequentially reflected by the second reflective element 150 to the first reflective element 130 and reflected by the first reflective element 130 to the light valve 140. In the embodiment, the second reflective element 150 and the first reflective element 130 can be used to change an optical path of the illumination beam LB, so that the illumination beam LB is incident to the light valve 140 at an appropriate angle. In this configuration, the optical engine module 100A including the second reflective element 150 and the first reflective element 130 can reduce an interference with the projection lens (further, can reduce an interference with optical elements of the projection lens), and thereby reduce the damage caused by an obscuration of light and optimize the space configuration inside the projection apparatus. In this way, the projection apparatus 10 configured with the optical engine module 100A can effectively improve the light output efficiency, be reduced in the cost and provide a favorable optical effect. In a preferred embodiment, the projection apparatus 10 can increase the brightness by >7%.

In summary, the embodiments of the invention have at least one of the following advantages or effects. In the projection apparatus of the invention, the optical engine module of the projection apparatus is disposed on the transmission path of the illumination beam that is formed by at least three laser beams, and this illumination beam is converted into an illumination beam with telecentric characteristics by the optical lens assembly and the reflective element of the optical engine module and is transmitted to the light valve. Therefore, the light output efficiency can be effectively improved and the costs can be effectively reduced while the contrast ratio of the projection apparatus is enhanced, thereby providing a favorable optical effect.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An optical engine module, disposed on a transmission path of an illumination beam comprising at least three laser beams, wherein the optical engine module comprises:
    a light homogenizing element, configured to enable the illumination beam to pass through;
    an optical lens assembly, disposed on the transmission path of the illumination beam, and wherein the optical lens assembly is constituted of at least three lenses having refractive power;
    a first reflective element, disposed on the transmission path of the illumination beam; and
    a light valve, disposed on the transmission path of the illumination beam and configured to convert the illumination beam into an image beam, wherein the illumination beam is sequentially transmitted from the light homogenizing element to the optical lens assembly and the first reflective element and is reflected by the first reflective element to the light valve;
    wherein a distance between a focus point of the illumination beam transmitted from the first reflective element to the light valve and the light valve is greater than or equal to 1000 mm.

2. The optical engine module as recited in claim 1, wherein a difference between incident angles of the illumination beam transmitted from the first reflective element to the light valve at different locations on the light valve is less than 1.5 degrees.

3. The optical engine module as recited in claim 1, wherein an F-number of the illumination beam transmitted from the first reflective element to the light valve ranges between 2.8 and 8.0.

4. The optical engine module as recited in claim 3, wherein the F-number of the illumination beam transmitted from the first reflective element to the light valve ranges between 3.0 and 3.4.

5. The optical engine module as recited in claim 1, wherein the optical lens assembly comprises an aperture, and the aperture is located between two adjacent lenses having refractive power.

6. The optical engine module as recited in claim 1, wherein the optical engine module further comprises:
    a second reflective element, disposed on the transmission path of the illumination beam and located between the optical lens assembly and the first reflective element.

7. A projection apparatus, comprising:
    an illumination system, comprising at least three laser light sources and providing at least three laser beams, and wherein the at least three laser beams are configured to form an illumination beam;

an optical engine module, disposed on a transmission path of the illumination beam, and wherein the optical engine module comprises:
 a light homogenizing element, configured to enable the illumination beam to pass through;
 an optical lens assembly, disposed on the transmission path of the illumination beam, and wherein the optical lens assembly is constituted of at least three lenses having refractive power;
 a first reflective element, disposed on the transmission path of the illumination beam; and
 a light valve, disposed on the transmission path of the illumination beam and configured to convert the illumination beam into an image beam; and a projection lens, disposed on the transmission path of the image beam and configured to project the image beam onto a projection target, wherein the illumination beam is sequentially transmitted from the light homogenizing element to the optical lens assembly and the first reflective element and is reflected by the first reflective element to the light valve;

wherein a distance between a focus point of the illumination beam transmitted from the first reflective element to the light valve and the light valve is greater than or equal to 1000 mm.

8. The projection apparatus as recited in claim 7, wherein a difference between incident angles of the illumination beam transmitted from the first reflective element to the light valve at different locations on the light valve is less than 1.5 degrees.

9. The projection apparatus as recited in claim 7, wherein an F-number of the illumination beam transmitted from the first reflective element to the light valve ranges between 2.8 and 8.0.

10. The projection apparatus as recited in claim 9, wherein the F-number of the illumination beam transmitted from the first reflective element to the light valve ranges between 3.0 and 3.4.

11. The projection apparatus as recited in claim 7, wherein the optical lens assembly comprises an aperture, and the aperture is located between two adjacent lenses having refractive power.

12. The projection apparatus as recited in claim 7, wherein the optical engine module further comprises a second reflective element disposed on the transmission path of the illumination beam and located between the optical lens assembly and the first reflective element.

13. The projection apparatus as recited in claim 7, wherein the illumination system further comprises a beam splitter assembly disposed on transmission paths of the at least three laser beams and configured to combine the at least three laser beams into a mixed beam.

14. The projection apparatus as recited in claim 7, wherein the illumination system further comprises a diffuser disposed on transmission paths of the at least three laser beams and configured to diffuse the at least three laser beams.

15. The projection apparatus as recited in claim 14, wherein the diffuser is located between the at least three laser light sources and the light homogenizing element.

16. The projection apparatus as recited in claim 7, wherein the projection apparatus further comprises:
 a planar optical element, disposed on a transmission path of the image beam, and the planar optical element is a dustproof piece or an optical element for enhancing resolution.

17. The projection apparatus as recited in claim 7, wherein a contrast ratio of the image beam is greater than 1500:1.

* * * * *